(12) United States Patent
Lee

(10) Patent No.: US 7,297,901 B2
(45) Date of Patent: Nov. 20, 2007

(54) PTC ELEMENT MODULE AND PRE-HEATER FOR VEHICLES INCLUDING THE SAME

(75) Inventor: Sung-Young Lee, Seoul (KR)

(73) Assignee: Woory industrial Company Ltd., Yongin-si, Kyongki-do (KR)

( * ) Notice: Subject to any disclaimer, the term of this patent is extended or adjusted under 35 U.S.C. 154(b) by 0 days.

(21) Appl. No.: 10/579,619

(22) PCT Filed: Nov. 11, 2004

(86) PCT No.: PCT/KR2004/002828
§ 371 (c)(1),
(2), (4) Date: May 17, 2006

(87) PCT Pub. No.: WO2005/049350
PCT Pub. Date: Jun. 2, 2005

(65) Prior Publication Data
US 2007/0095809 A1  May 3, 2007

(30) Foreign Application Priority Data
Nov. 18, 2003 (KR) .................. 10-2003-0081465

(51) Int. Cl.
*B60L 1/02* (2006.01)
(52) U.S. Cl. .............. 219/202; 219/505; 219/540
(58) Field of Classification Search ............ 219/202, 219/505, 540
See application file for complete search history.

(56) References Cited

U.S. PATENT DOCUMENTS 5,256,857 A * 10/1993 Curhan et al. ............... 219/202
5,266,857 A * 11/1993 Gotoh .......................... 310/71
5,562,844 A * 10/1996 Bohlender et al. .......... 219/540
5,854,471 A * 12/1998 Tadokoro et al. ........... 219/540
6,472,645 B1 * 10/2002 Bohlender ................... 219/505

FOREIGN PATENT DOCUMENTS

| DE | 20305936   | 8/2003 |
| JP | 2-3693     | 1/1990 |
| KR | 20-144945  | 4/1997 |
| KR | 20-0302522 | 1/2003 |

* cited by examiner

Primary Examiner—Tu Ba Hoang
Assistant Examiner—Vinod Patel
(74) Attorney, Agent, or Firm—Needle & Rosenberg, P.C.

(57) ABSTRACT

Disclosed is a pre-heater for vehicles comprising: A PTC element module including a positive terminal composed of two sheets, an upper sheet of which has a fastening hole and upward bended ribs formed at opposite edges of the fastening hole; a ring-shaped insert insulator inserted between the ribs; a PTC element inserted into an inside of the insert insulator, a bottom surface of which is in contact with a lower sheet of the positive terminal; one heat fin assembly closely fastened to one surface of the PTC element; another heat fin assembly fastened to the other surface of the PTC element through the medium of a positive terminal and an entire surface insulator; and a fastening insulator for binding together the two heat fin assemblies, the PTC element, the positive terminal and the entire surface insulator, and a heat fin assembly disposed parallel to the PTC element module; a negative terminal disposed parallel to the heat fin assembly; frames and respectively fastened to both ends of a combined body including the PTC element module; the heat fin assembly, and the negative terminal; and housing and respectively fastened to both longitudinal ends of a combined body including the PTC element module, the heat fin assembly, the negative terminal, and the frames and. In accordance with the present invention, the pre-heater has advantages capable of more facilitating assembly and maintenance and remarkably improving productivity, since the PTC element module and so on may be modulized.

10 Claims, 7 Drawing Sheets

(a)

(b)

(a)

(b)

(a)

(b)

PTC ELEMENT MODULE AND PRE-HEATER FOR VEHICLES INCLUDING THE SAME

CROSS REFERENCE TO RELATED APPLICATIONS

The present application claims priority to Korean Patent Application No. 10-2003-0081466, filed Nov. 18, 2003, which application is incorporated herein fully by this reference.

TECHNICAL FIELD

The present invention relates to a PTC element module and a pre-heater for vehicles including the same, and more particularly, to a PTC element module for pre-heating the air in vehicles using heat generation of a PTC element and a pre-heater for vehicles including the same.

BACKGROUND ART

In general vehicles, in order to heat the interior of the vehicles, dehumidify or defrost a front window of the vehicles, a heating system using heat energy of coolant heated by engine is installed therein.

In the case of this heating system, since the coolant flowing around the engine is introduced into a heater after the engine is operated, it should be time consuming to heat the interior after the coolant is heated. Therefore, after starting the engine, a driver must wait in cold for an interval long enough to heat the interior.

Meanwhile, Korean Utility Model Publication No. 20-144945 discloses a preheating system using a PTC (positive temperature coefficient) element in order to solve the problems. A structure of the preheating system will be described as follows.

As shown in FIG. 1, in an heater for vehicles including a plurality of PTC elements 20 for generating heat by supplying power, a plurality of isolation members 13 having through-holes for receiving the PTC elements are installed in a frame 11 in parallel with each other, a plurality of radiator fins 15 are installed between the respective isolation members 13 to facilitate a heat exchange, terminals (for example, negative terminals) at one side of each PTC element are integrated as one member to be connected to a power source, and terminals (for example, positive terminals) at the other side of each PTC element are connected to the power source through the medium of individually operating switches (not shown).

In addition, plates 17 and 18 are disposed between the isolation members 13 and the radiator fins 15.

In this connection, a reference numeral "19" designates terminal plates installed at front and rear sides of the frame 11, one end of the plate 17 is connected to the terminal plate to form one negative terminal together with the frame, and one end of the plate 18 is connected to a wire (not shown) to form one positive terminal, respectively.

In the aforementioned conventional pre-heater for vehicles, since components constituting the pre-heater are not modulized, assembly operations should be individually performed, thereby lowering productivity and operation performance.

DISCLOSURE OF THE INVENTION

Technical Problem

Therefore, the present invention has been made in view of the above-mentioned problems, and it is an object of the present invention to provide a PTC element module and a pre-heater for vehicles including the same capable of readily conforming with size of vehicles by freely varying width and volume of modulized components, and remarkably improving productivity by facilitating its assembly operation.

Technical Solution

In order to accomplish the above object, there is provided a PTC element module of a pre-heater for vehicles including a PTC element in accordance with the present invention comprising: a positive terminal composed of two sheets, an upper sheet of which has a fastening hole and upward bended ribs formed at opposite edges of the fastening hole; a ring-shaped insert insulator inserted between the ribs; a PTC element inserted into an inside of the insert insulator, a bottom surface of which is in contact with a lower sheet of the positive terminal; one heat fin assembly closely fastened to one surface of the PTC element; another heat fin assembly fastened to the other surface of the PTC element through the medium of a positive terminal and an entire surface insulator; and a fastening insulator for binding together the heat fin assemblies, the PTC element, the positive terminal and the entire surface insulator.

The heat fin assembly is formed of a corrugated heat fin fastened to one heat fin plate.

In addition, the fastening insulator may include a longitudinally extending thin and long member and a "⊂" shaped insert member formed inward from the thin and long member.

Further, the PTC element and the insert insulator preferably have rectangular shapes. Meanwhile, a pre-heater for vehicles in accordance with the present invention includes: the PTC element module; a heat fin assembly disposed parallel to the PTC element module; a negative terminal disposed parallel to the heat fin assembly; frames respectively fastened to both ends of a combined body including the PTC element module, the heat fin assembly, and the negative terminal; and housings respectively fastened to both longitudinal ends of a combined body including the PTC element module, the heat fin assembly, the negative terminal, and the frames.

In this connection, preferably, the pre-heater additionally includes fastening means for binding the PTC element module, the heat fin assembly, and the negative terminal at a longitudinal middle position thereof.

The both frames are preferably fastened to a heat fin of the heat fin assembly through the medium of a fin protector.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Hereinafter, a preferred embodiment of the present invention and the above basic concept will be described with reference to accompanying drawings.

Figure 1:
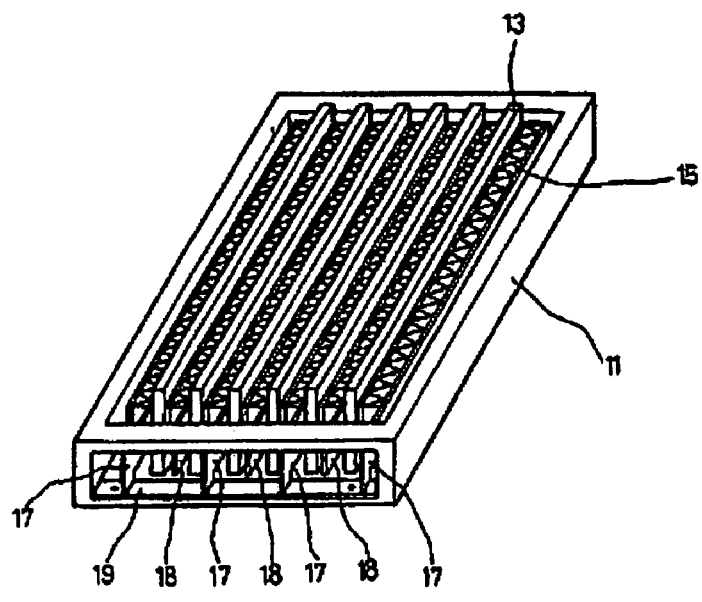
FIG. 1 is a view illustrating a structure of a conventional pre-heater for vehicles, (a) of which is a perspective view, and (b) of which is a plan view.
Figure 1:
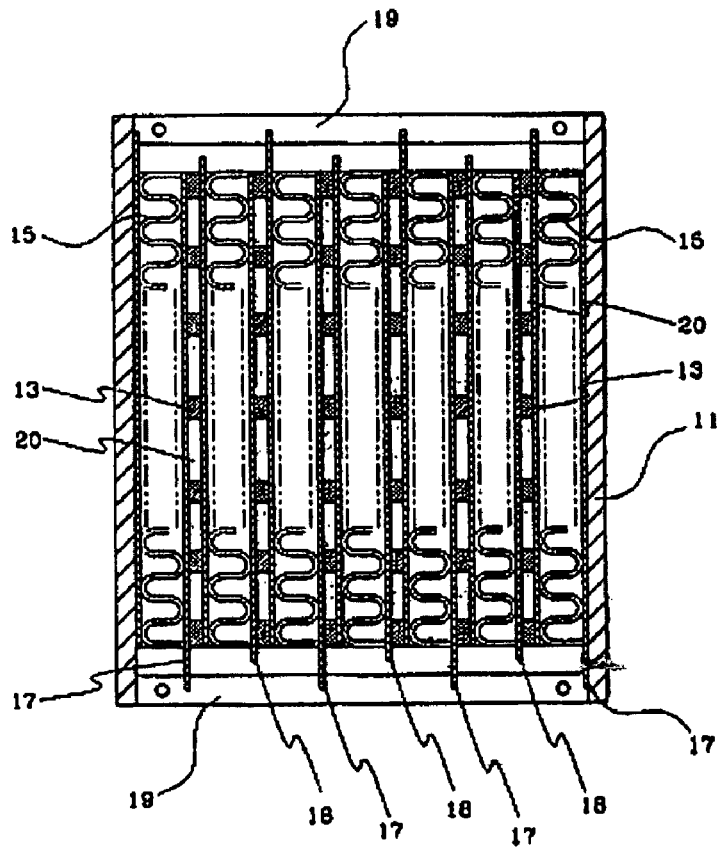
Figure 2:
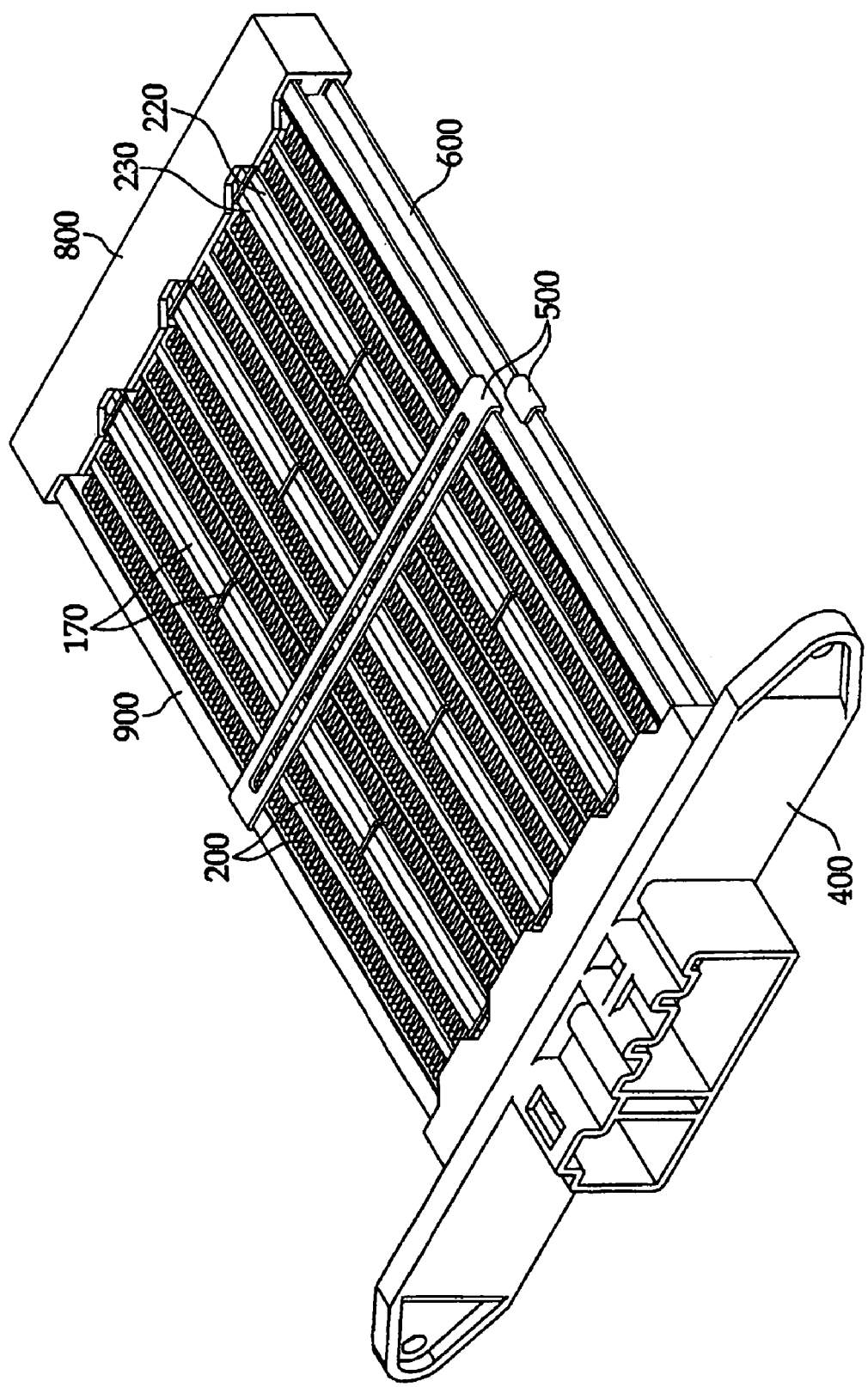
FIG. 2 is a perspective view of a pre-heater for vehicles in accordance with the present invention.
Figure 3:
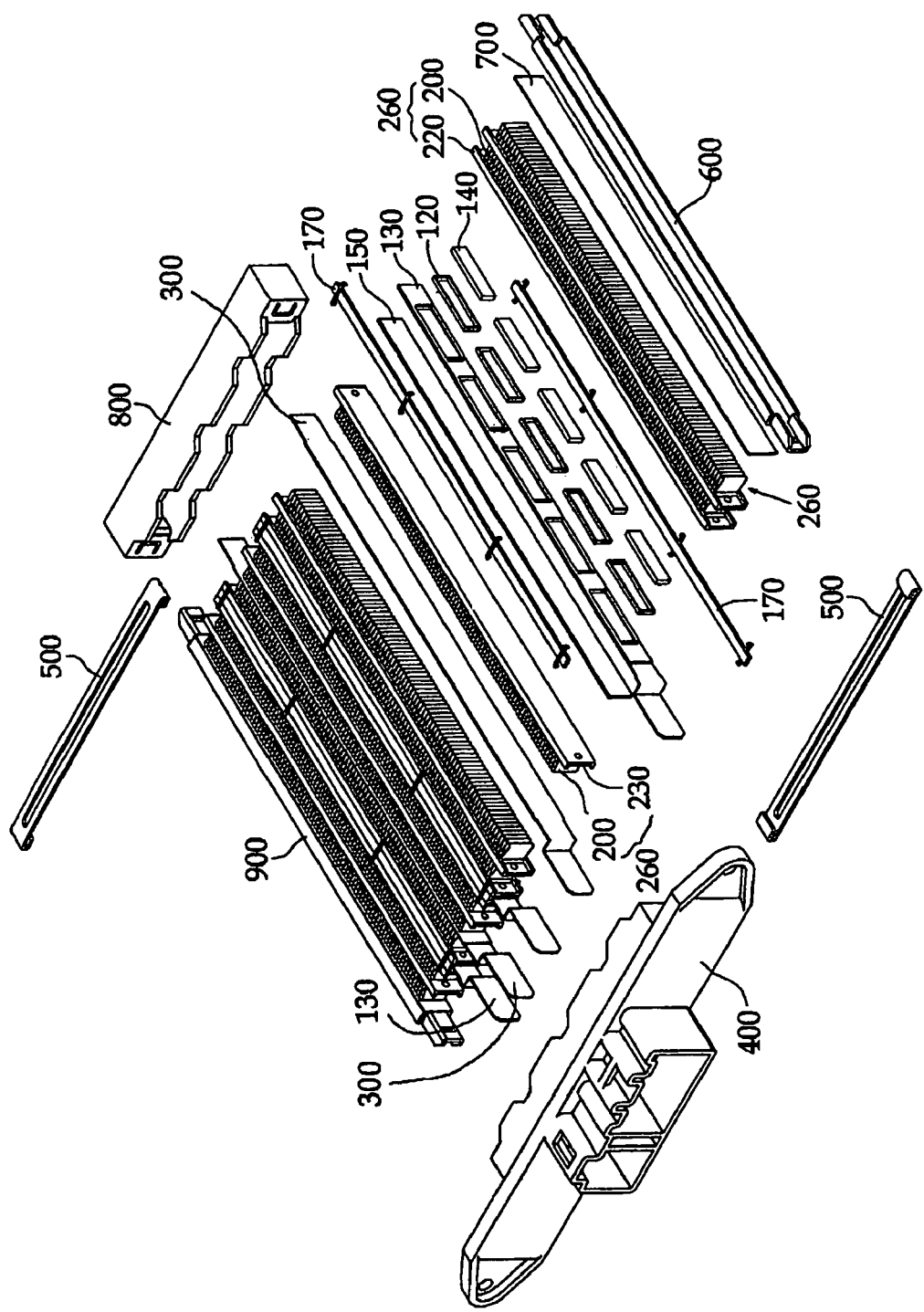
FIG. 3 is an exploded perspective view of a pre-heater for vehicles in accordance with the present invention.

FIGS. 2 and 3 illustrate an overall structure of a pre-heater for vehicles in accordance with the present invention.

As shown in FIGS. 2 and 3, the pre-heater for vehicles in accordance with the present invention includes: a PTC element module 100 having a PTC element, heat fin assemblies 260 disposed parallel to both sides of the PTC element module 100 respectively, negative terminals 300 disposed parallel to the heat fin assemblies 260, frames 600 and 900 respectively fastened to lateral ends of a combined body including the PTC element module 100, the heat fin assemblies 260, and the negative terminals 300, and housings 400 and 800 respectively fastened to both longitudinal ends of a combined body including the PTC element module 100, the heat fin assemblies 260, the negative terminals 300, and the frames 600 and 900.

The respective components for constituting the pre-heater for vehicles in accordance with the present invention will be described as follows.

Figure 4:
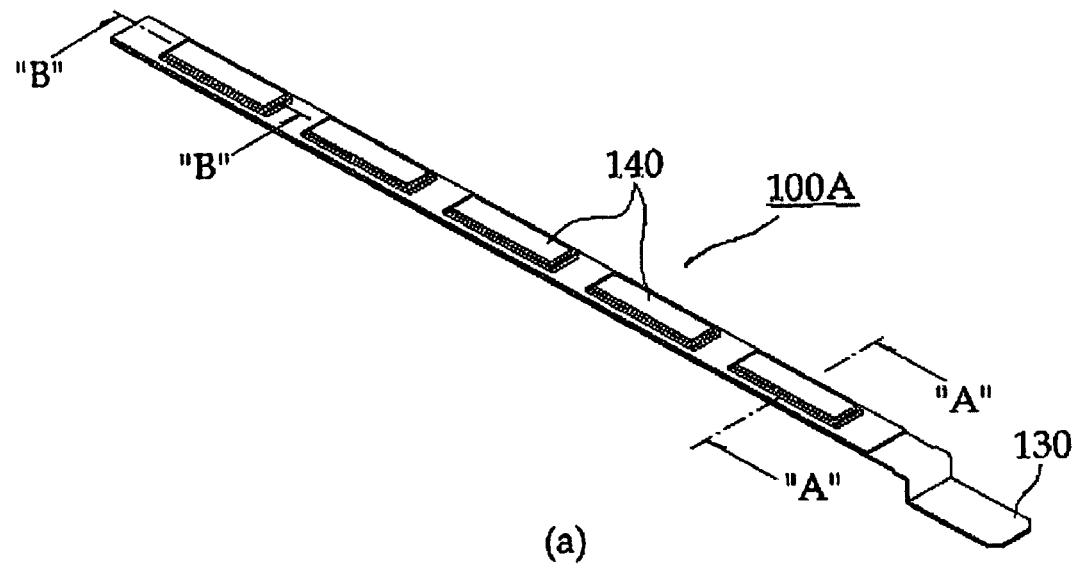
FIG. 4 is a view illustrating a PTC element module included in a pre-heater in accordance with the present invention, (a) of which is a perspective view, and (b) of which is an exploded perspective view.
Figure 4:
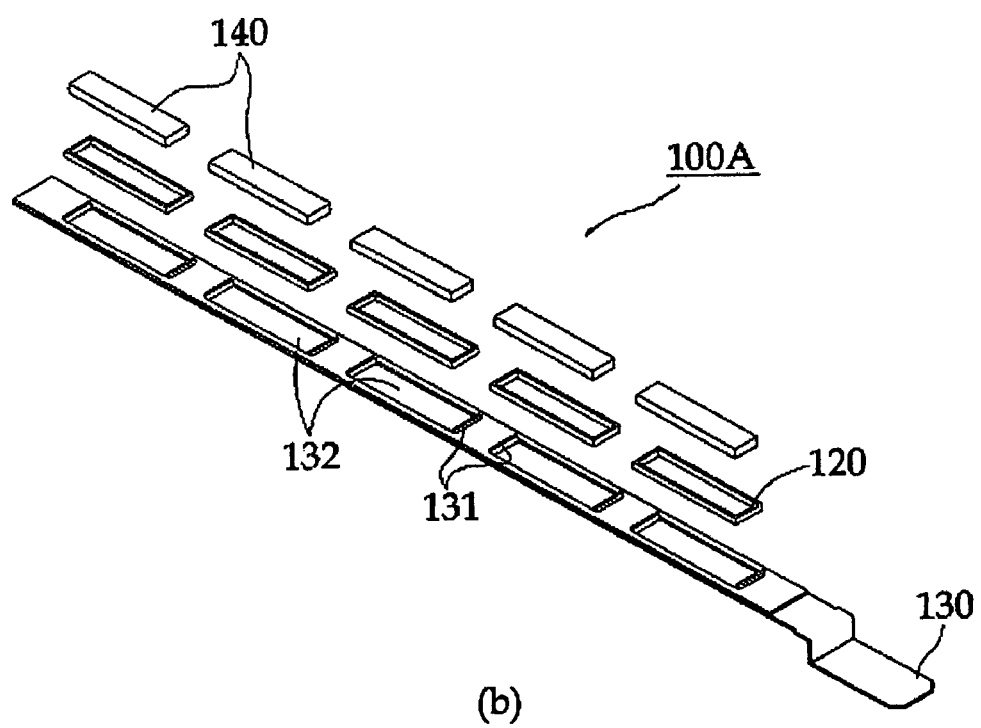
Figure 5:
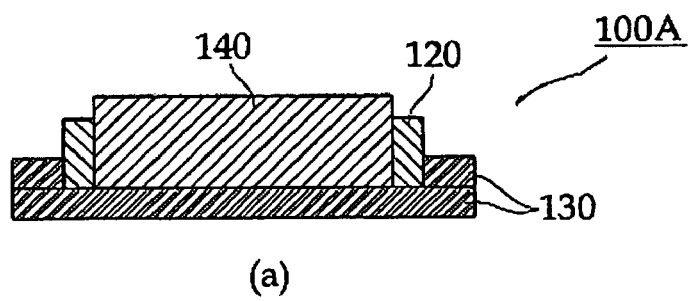
FIG. 5 is a view illustrating a PTC element module included in a pre-heater in accordance with the present invention, (a) of which is a lateral cross-sectional view taken along the line A-A in FIGS. 4(a), and (b) of which is a lateral cross-sectional view taken along the line B-B in FIG. 4(a)
Figure 5:
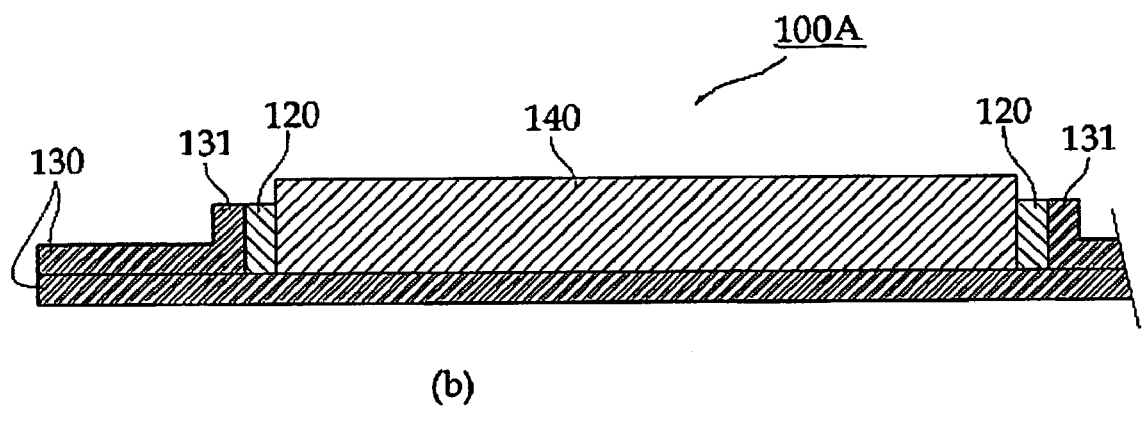

FIGS. 4 and 5 illustrate a structure of a PTC element assembly 100A.

As shown in FIGS. 4 and 5, the PTC element assembly 100A includes a strip-shaped positive terminal 130 having fastening holes 132 formed along its longitudinal direction and ribs 131 projected from front and rear edges of the fastening holes 132. In order to form the PTC element assembly, a thin layer (having a thickness of about 0.8 mm) for forming the positive terminal 130 may be folded into halves, and an upper half of the assembly 100A has the fastening holes 132 for inserting the PTC element and the ribs 131 formed at the edges of the fastening holes 132. The ribs 131 have shapes that the front and rear edges of the fastening holes 132 are bended up.

When there is no difficulty in a manufacturing process, the ribs 131 may be formed at right and left edges of the fastening holes 132.

In addition, a thin ring-shaped insert insulator 120 is disposed to be closely inserted into the ribs 131.

Further, a PTC element 140 is inserted between the ribs 131 of the positive terminal 130 through the medium of the insert insulator 120.

Therefore, the insert insulator 120 and the PTC element 140 are closely fitted between the ribs 131.

Figure 6:
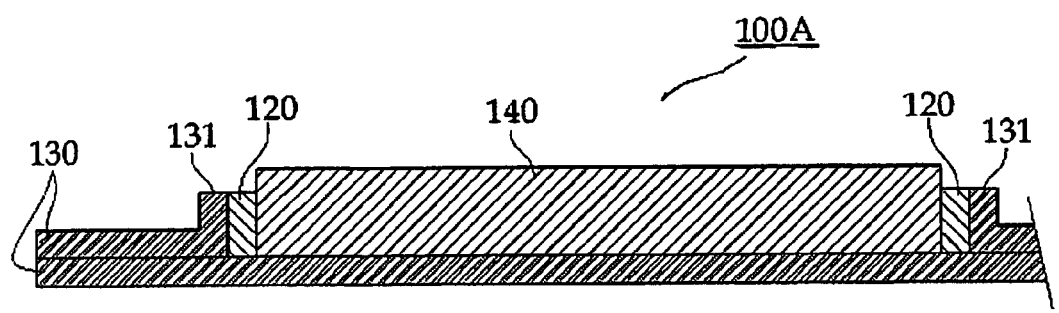
FIG. 6 is a view illustrating processes of forming ribs of a PTC element module included in a pre-heater in accordance with the present invention, (a) of which is before deformation, and (b) of which is after deformation.
Figure 6:
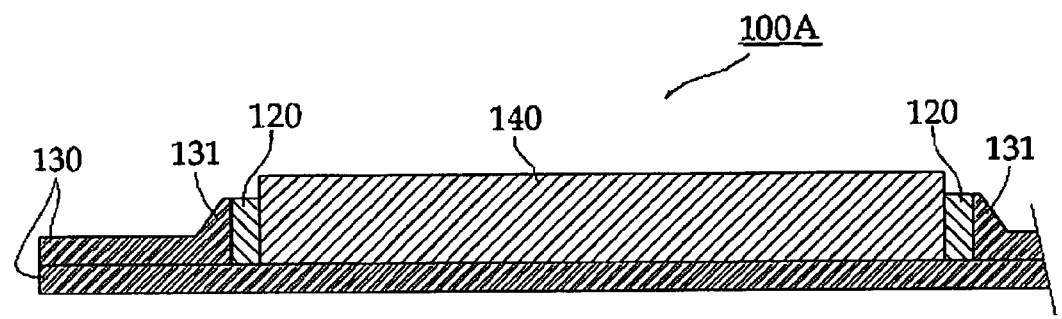

In this state, as shown in FIG. 6, when side surfaces of the ribs 131 are pressed inward by a swaging machine and so on, the ribs 131 are deformed, and simultaneously, the insert insulator 120 is pushed inward to rigidly fasten the PTC element 140.

Figure 7:
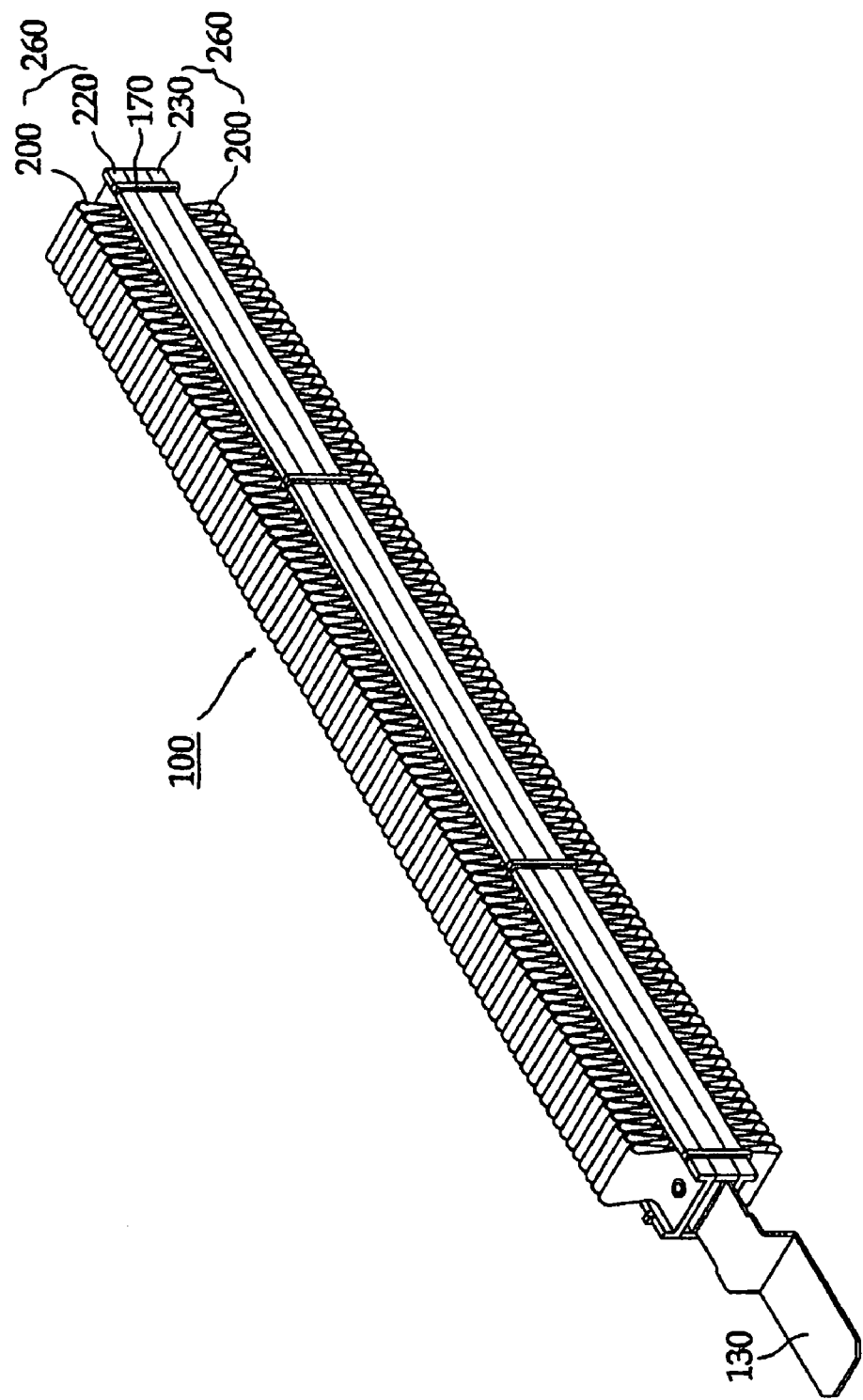
FIG. 7 is a perspective view illustrating a configuration that a heat pin is fastened to a PTC element module in accordance with the present invention.

Meanwhile, a first heat fin plate 220 is closely fastened to an upper surface of the PTC element 140, and a corrugated heat fin 200 is installed on the first heat fin plate 220 (see FIG. 7). Preferably, the heat fin 200 and the first heat fin plate 220 are made of a light material such as aluminum having a high thermal conductivity.

The heat fin 200 may be fixedly fastened to the first heat fin plate 220 by a spot welding method.

On the other hand, when the first heat fin plate 220 is formed in a channel shape and longitudinal grooves are formed along both inner sides of the channel, since a front end of the heat fin 200 may be guided along the channel, the heat fin 200 may be detachably installed at the fin plate 220.

In addition, a second heat fin plate 230 and a heat fin 200 are fastened to a lower surface of the positive terminal 130 through the medium of an entire surface insulator 150. Here, the structure that the heat fin 200 is installed on the second heat fin plate 230 is similar to that the heat fin 200 is installed on the first heat fin plate 220.

The first heat fin plate 220, the PTC element 140, the positive terminal 130, the entire surface insulator 150 and the second heat fin plate 230 which are stacked as described above may be bound together by a fastening insulator 170.

The fastening insulator 170 includes a longitudinally extending thin and long member and a "⊂" shaped insert member formed inward from the thin and long member. In addition, the fastening insulator 170 is made of a resilient material to securely fix the components.

Meanwhile, the PTC element module 100, the heat fin assembly 260, the negative terminal 300 and the frames 600 and 900 are bound by the housings 400 and 800 made of a material such as PBT and so on, at their both ends.

Moreover, in order to reinforce the fastening strength, preferably, the pre-heater additionally includes fastening means 500 for binding the components at a longitudinal middle position thereof. In this case, the fastening means 500 made of a clip and so on may connect the both frames 600 and 900 to each other at upper are lower surfaces of the combined body including the PTC element module 100, the heat fin assembly 260 and the negative terminal 300, along its lateral direction.

In addition, the housings 400 and 800 have fastening grooves, into which ends of the channel-shaped frames 600 and 900 may be inserted, respectively.

Further, preferably, the heat fin 200 is fastened to the frame 600 through the medium of a fin protector 700 made of a SUS plate to prevent the fin from deforming during assembly or use.

INDUSTRIAL APPLICABILITY

As can be seen from the foregoing, the present invention has advantages capable of more facilitating assembly and maintenance and remarkably improving productivity, since the PTC element module and so on may be modulized.

In addition, the PTC element module and so on may be readily adapted to another car model by modifying the housing structure only, without additional operation, since they are assembled as a module.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A PTC element module of a pre-heater for vehicles including a PTC element, comprising:
   a positive terminal composed of two sheets, an upper sheet of which has a fastening hole and upward bended ribs formed at opposite edges of the fastening hole;
   a ring-shaped insert insulator inserted between the ribs;
   a PTC element inserted into an inside of the insert insulator a bottom surface of which is in contact with a lower sheet of the positive terminal;
   one heat fin assembly closely fastened to one surface of the PTC element;
   another heat fin assembly fastened to the other surface of the PTC element through the medium of a positive terminal and an entire surface insulator;
   and a fastening insulator for binding together the two heat fin assemblies, the PTC element, the positive terminal and the entire surface insulator.

2. The PTC element module according to claim 1, wherein the heat fin assembly is formed of a corrugated heat fin fastened to one heat fin plate.

3. The PTC element module according to claim 1, wherein the fastening insulator comprises a longitudinally extending thin and long member and a "C" shaped insert member formed inward from the thin and long member.

4. The PTC element module according to claim 1, wherein the PTC element and the insert insulator have rectangular shapes.

5. A pre-heater for vehicles comprising:
   the PTC element module according to claim 1;
   a heat fin assembly disposed parallel to the PTC element module;
   a negative terminal disposed parallel to the heat fin assembly;
   frames fastened to both lateral ends of a combined body including the PTC element module, the heat fin assembly, and the negative terminal; and
   housings fastened to both longitudinal ends of a combined body including the PTC element module, the heat fin assembly, the negative terminal, and the frames.

6. The pre-heater for vehicles according to claim 5, further comprising fastening means for binding together the PTC element module, the heat fin assembly, and the negative terminal at a longitudinal middle position thereof.

7. The pre-heater for vehicles according to claim 5, wherein the frames are fastened to a heat fin of the heat fin assembly through the medium of a fin protector.

8. A pre-heater for vehicles comprising:
   the PTC element module according to claim 2;
   a heat fin assembly disposed parallel to the PTC element module;
   a negative terminal disposed parallel to the heat fin assembly;
   frames fastened to both lateral ends of a combined body including the PTC element module, the heat fin assembly, and the negative terminal; and
   housings fastened to both longitudinal ends of a combined body including the PTC element module, the heat fin assembly, the negative terminal, and the frames.

9. The pre-heater for vehicles according to claim 8, further comprising fastening means for binding together the PTC element module, the heat fin assembly, and the negative terminal at a longitudinal middle position thereof.

10. The pre-heater for vehicles according to claim 8, wherein the frames are fastened to a heat fin of the heat fin assembly through the medium of a fin protector.

* * * * *